United States Patent
Saussele et al.

(10) Patent No.: US 6,545,380 B1
(45) Date of Patent: Apr. 8, 2003

(54) METHOD FOR ASSEMBLING A WINDSCREEN WIPER DRIVE MECHANISM AND A DRIVE MECHANISM PRODUCED ACCORDING TO THIS METHOD

(75) Inventors: Werner Saussele, Besigheim (DE); Bernd Walther, Bietigheim-Bissingen (DE); Eckhardt Schmid, Brackenheim (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/601,779

(22) PCT Filed: Feb. 1, 1999

(86) PCT No.: PCT/EP99/00638

§ 371 (c)(1),
(2), (4) Date: Aug. 7, 2000

(87) PCT Pub. No.: WO99/39946

PCT Pub. Date: Aug. 12, 1999

(30) Foreign Application Priority Data

Feb. 7, 1998 (DE) .......................................... 198 04 954

(51) Int. Cl.⁷ ............................ H02K 7/10; A47L 1/00; B60S 1/26; F16D 43/00
(52) U.S. Cl. ................ 310/75 R; 15/250.31; 310/83
(58) Field of Search ............................. 200/19.01–19.4; 310/78, 75 R, 83; 464/185; 15/250.31

(56) References Cited

U.S. PATENT DOCUMENTS

| 4,609,794 A | * | 9/1986 | Porter | 200/19.07 X |
| 4,774,423 A | | 9/1988 | Karasawa et al. | 310/78 |
| 5,068,500 A | * | 11/1991 | Kitada | 200/19.01 |
| 6,255,605 B1 | * | 7/2001 | Leiter et al. | 200/19.2 |

FOREIGN PATENT DOCUMENTS

| DE | 1118 341 | 11/1961 |
| DE | 2 223 067 | 5/1972 |
| DE | 41 35 652 | 5/1992 |
| FR | 2 649 946 | 1/1991 |
| FR | 2 698 941 | 6/1994 |
| GB | 1 448 892 | 9/1976 |
| GB | 2 044 551 | 10/1980 |
| JP | 4 193650 | 7/1992 |

* cited by examiner

*Primary Examiner*—J. R. Scott
(74) *Attorney, Agent, or Firm*—J. Gordon Lewis

(57) ABSTRACT

The invention relates to a windscreen wiper drive mechanism in which an output lever can be fixed on a gear wheel at a predetermined angle, the gear wheel adopting a position at a defined angle. Before assembly, the output shaft should be connected to the output lever in such a way that it cannot be detached. The invention also relates to a method for assembling a drive system of this type. The inventive method consists essentially of the following steps: moving the gear wheel into the defined end position (park position) independently of engagement with the output shaft and then connecting the output shaft to which the output lever was previously undetachably fixed to the gear wheel, with a press fit. Advantageous embodiments describe appropriate bearing possibilities for the gear wheel and suitable steps for facilitating the pressing-in process.

19 Claims, 3 Drawing Sheets

METHOD FOR ASSEMBLING A WINDSCREEN WIPER DRIVE MECHANISM AND A DRIVE MECHANISM PRODUCED ACCORDING TO THIS METHOD

BACKGROUND

In electrically driven windscreen wipers, the wiper arms are driven via a reduction gear by the shaft of an electric motor. Here, it is important that the position of the angle of rotation of the reduction gear wheel in the gear housing is assigned to a certain angular position of the windscreen wiper. For this reason, during the mounting of known drives, the gear wheel driving the wiper arm is moved into a certain angular position (parked position) and subsequently, the wiper arm located in the corresponding angular position is locked into position opposite the gear wheel. This takes place because on the output shaft of the gear wheel located in the parked position, the crank lever is placed in a defined angular position and is locked into position opposite the drive shaft. At that point, it is assumed that the rotation of the gear wheel, which is in the same direction, is converted via the crank lever into a pivoting movement of the wiper arm. The above means, however, is also appropriate when the pivoting movement of the wiper arms is achieved by reversing the direction of rotation of the motor. Here, according to its nature, the crank lever may be omitted and possibly the wiper arm itself or a drive member of a simple linkage arrangement can be placed on the drive shaft of the gear wheel in a defined angular position.

The known way of fixing the crank lever with respect to the drive shaft can be seen, for example, in DE-OS 44 02 476. This mode of attachment is disadvantageous because the drive shaft must be provided at its end with a conical fluting to which a threading connects. Furthermore, an assigned fluting is required in connection with the crank lever and finally, a nut which can brace and stop the crank lever with respect to the drive shaft.

The known assembly method is costly with respect to the required parts and the required assembly time. Moreover, the known construction requires more room than absolutely necessary since the end of the crank lever which is turned away from the output shaft must be located outside the plane of the attachment nut. Thus, it is necessary for the crank lever to bend outwards beyond the outer front face of the nut.

SUMMARY OF THE INVENTION

It is the task of the invention to indicate a new method for assembling the drive shaft at the gear wheel, whereby the mentioned disadvantages are prevented. The invention consists in principle of a gear wheel which is moved independently of the output shaft, into a predetermined angular position (parked position) and an output shaft, which is in defined angular position, is then connected to the gear wheel. The described mode of connection is advantageous not only for drive mechanisms of windscreen wipers, but rather for every case when the drive shaft, located in a predetermined angular position, is to be tightly connected to the gear wheel which is in a certain angular position, as may be the case, for example, with crankshafts and similar arrangements.

In essence, the advantage of the invention consists in that the output shaft and the angle lever (or crank lever) may already be rigidly connected to each other prior to installation. This can be achieved, for example, by riveting, welding, caulking or also by means of a single-piece cast part. Thereby, the above-described connection parts, such as threadings, nut, fluting and the like are omitted.

A particularly advantageous connection between the drive shaft and the gear wheel can be achieved by the combination of features of the invention. However, other connection types are also possible. For example, by means of an appropriate longitudinal fluting of the drive shaft and an appropriate bore hole in the gear wheel, an appropriate synchronization force of the gear wheel with respect to the drive shaft can be provided without requiring the two mentioned drive elements to be pressed against each other.

A refinement of the invention provides an appropriate support for the gear wheel with respect to the drive shaft. For example, this can take place either directly, wherein a suitable support device forms an abutment for the gear wheel during the pressing process or even indirectly, wherein the gear wheel supports itself against the adjacent housing wall in its longitudinal direction and the support area of the housing is in turn supported from the outside by means of a holding device during the pressing process.

The method of the invention assumes that at the beginning of the mounting process, the gear wheel is moved into the defined end position (parked position), wherein the corresponding rotation is still independent of the rotary position of the drive shaft. During this initial rotation, the gear wheel should be mounted so that it can rotate. Within the framework of the invention, it is conceivable to provide an auxiliary shaft for this purpose instead of the drive shaft or to push the drive shaft only far enough into the bearing hole of the gear wheel, so that the gear wheel can rotate about the drive shaft while, nonetheless, being secured in radial position. For the final locking into position of the gear wheel with respect to the output shaft, either the auxiliary shaft is removed and then the output shaft is press-fitted or the output shaft, in a second case, is tightly connected to the gear wheel by means of a pressing force.

One combination of features of the invention proposes an electrical windscreen wiper drive mechanism which is particularly suited for the purpose of carrying out the process and, especially, for an initial rotation of the gear wheel into its final position, when the output shaft is removed. The mounting of the gear wheel is particularly simple due to the application of a combination of features in which projections are provided which extend parallel to the longitudinal axis of the gear wheel and which engage a rotating cover surface of the gear wheel and thus secure the gear wheel in the radial direction. Preferably, the securing of the gear wheel in the axial direction takes place by means of assigned side walls of the gear housing which engage the appropriate front faces of the gear wheel itself or a hub of the gear wheel. Since the gear wheels are frequently provided with a toothing along the outer periphery, in a refinement of the invention, a combination of features includes a gear wheel which has an essentially cylindrical hub that protrudes along its longitudinal axis, wherein the cover surface of the hub can engage the mentioned projections. Naturally, also two hubs may be provided which connect to the two lateral surfaces of the gear wheel.

BRIEF DESCRIPTION OF THE DRAWING

An embodiment of the invention is explained below with reference to the drawing in which.

DESCRIPTION OF THE PREFERRED EMBODIMENT

Figure 1:
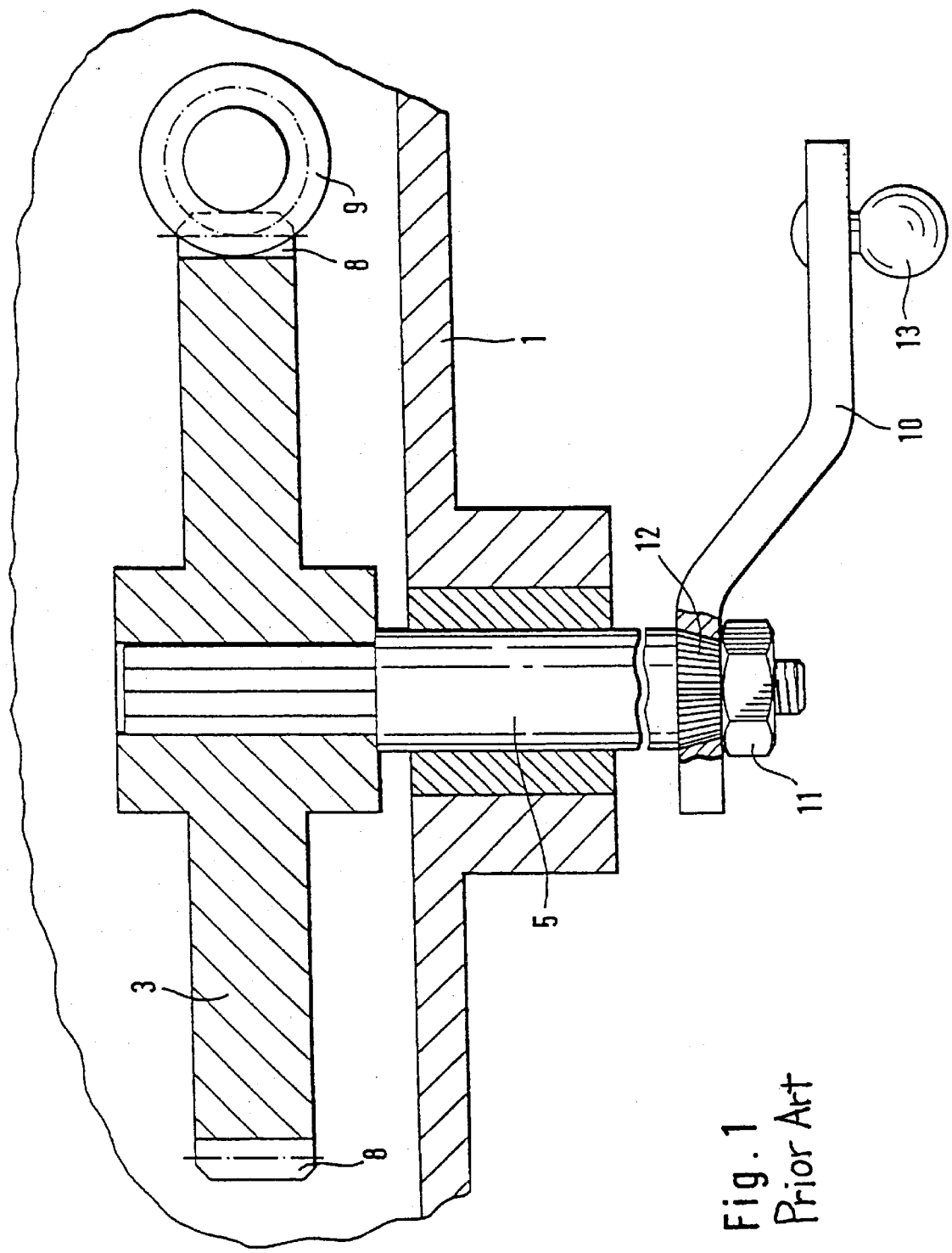
FIG. 1 is a cross sectional view of parts of a known assembly of a windscreen wiper drive mechanism in greatly simplified form.

In FIG. 1, a section of a gear housing 1 is indicated and by means of an output shaft 5, a gear wheel 3 is rotatably supported inside the housing. The gear wheel is provided with an external toothing 8 that drives the wheel by means of a worm wheel 9. The worm wheel 9 is connected to the shaft of an electric motor. The mounting of the known assembly according to FIG. 1 takes place in such a way that the gear wheel 3 is moved by means of the worm wheel 9 into a predetermined angular position (parked position), wherein, by means of contact between contacts provided on the gear wheel and fixed contacts, the motor is turned off at the appropriate position of the gear wheel. During this process, the output shaft 5 is tightly connected to the gear wheel 3. Only after the gear wheel has reached its parked position, a crank lever 10 is placed onto the drive shaft 5 in a predetermined angular position and is secured in this position by means of a nut 11. In order to secure the output shaft 5 in its angular position with respect to the crank lever 10, fluting 12 is provided. It is important for the crank lever 10 to be bent at a right angle toward the outside so that the linkage (not shown) connected to the crank lever 10 via a ball joint 13, for example, is located outside the external front face of the nut 11 or the output shaft 5.

Figure 2:
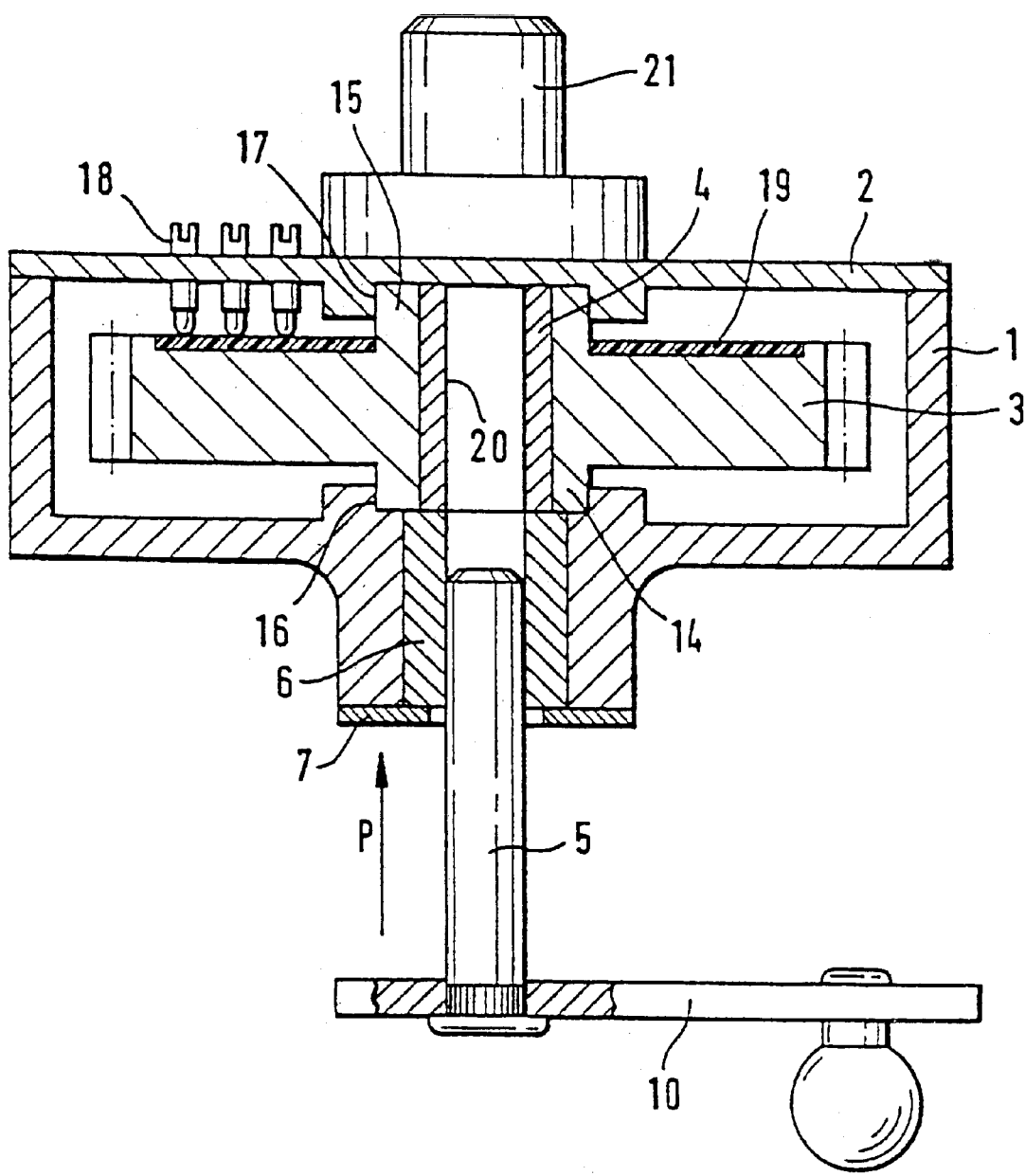
FIG. 2 is a cross section view of a drive mechanism in accordance with the invention shown during the mounting states.

FIG. 2 shows the drive in accordance with the invention during its first mounting phase. There, the output shaft 5 is located outside the range of engagement of the gear wheel 3. The gear wheel 3 has two hubs 14, 15 which are supported in two cylindrical recesses 16, 17 in the radial direction as well as in the direction of the axis of rotation of the gear wheel. Since, in the housing lid 2 as well as the housing 1 itself, the side walls have reduced thicknesses outside the bearings of the hub, one can regard the cylindrical recesses also as bearing bushings worked into the housing or the lid. It is important that in this way an auxiliary bearing is provided in the housing 1, 2 that can move the gear wheel 3 into its parked position without being supported on the output shaft 5 via the worm wheel, not shown. The turning off of the drive motor in the parked position takes place in a known way via contacts 18 which engage a contact disk 19. At that time, the contact disk 19 is connected to the gear wheel 3 and the contacts 18 are connected to the housing lid 2.

When the gear wheel is in its final position (or parked position), the output shaft 5 is press-fitted into a predetermined rotary position in the direction of the arrow (P) into the bearing hole 20. In order to prevent the gear wheel from destroying the housing 1, 2 during this pressing process, the housing is supported by means of a support tool. This takes place in that the support tool 21 supports the area of the lid 2 on which the hub 15 of the gear wheel 3 acts during the press-fit process of the output shaft 5.

It is important for the invention that during the process of the invention, the unit consisting of the output shaft 5 and the crank shaft 10 can be assembled very simply. Thus, for example, this unit may be one piece or may be joined by means of a permanent bond in a simple way. In FIG. 2, bearing boxes 4 and 6 are shown which do not directly have anything to do with the invention. They serve the purpose of providing suitable bearing or connecting points which make it possible to produce the housing 1, 2 and/or the friction wheel 3 from an inexpensive material which is less suited for bearing purposes.

Figure 3:
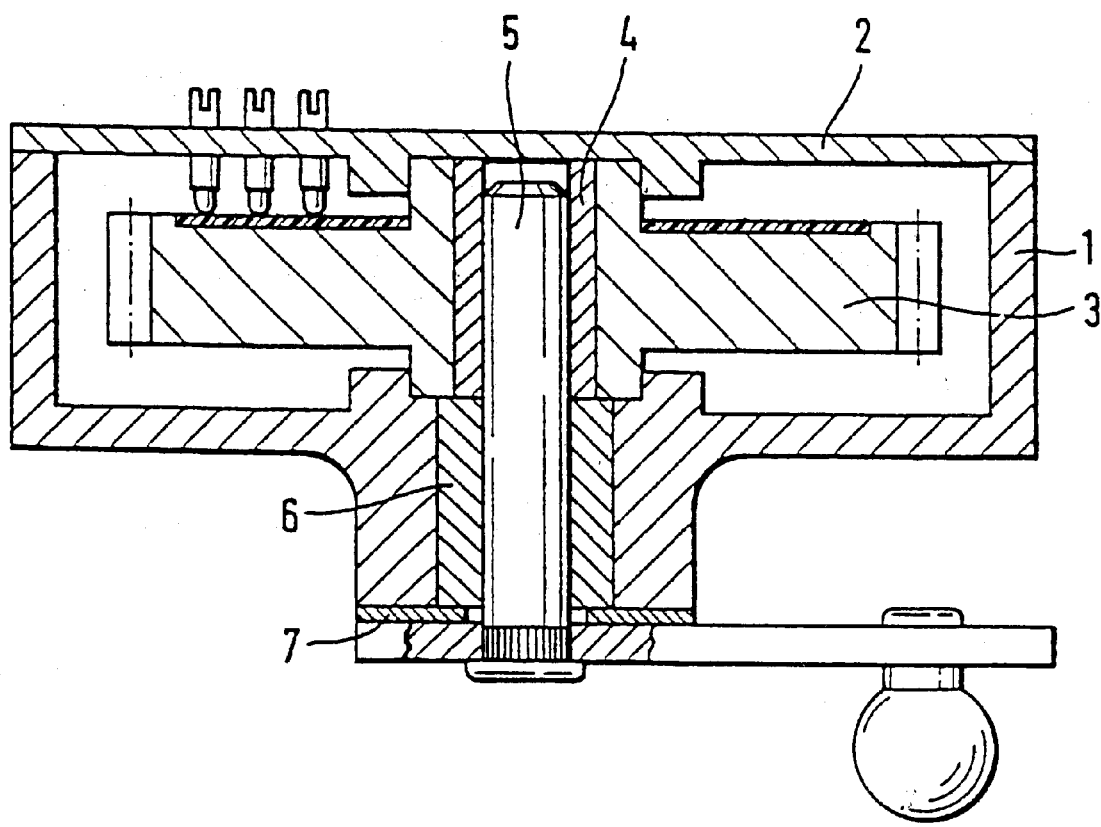
FIG. 3 is a cross sectional view of the drive mechanism in accordance with the invention shown in the mounted state.

Finally, FIG. 3 shows the drive in accordance with the invention in the assembled state, wherein the output shaft 5 is connected to the bearing cage 4 of the gear wheel 3 by means of a pressing process.

What is claimed is:

1. A method for assembling an output shaft in a gear wheel of a windscreen wiper drive mechanism comprising the steps of:

rotating the gear wheel with respect to the output shaft to a first rotary position; and engaging the output shaft with respect to the gear wheel after the rotating step, where the output shaft defines a second rotary position independent of the first rotary position of the gear wheel.

2. The method of claim 1 wherein the engaging step further comprising the step of:

connecting the output shaft to the gear wheel via a press fit.

3. The method of claim 2 further comprising the step of:

supporting the gear wheel by a support tool when the output shaft and gear wheel are being engaged with respect to one another.

4. A windscreen wiper drive mechanism manufactured according to the method of claim 1 wherein the gear wheel is rotatably mounted in a housing, an electric motor drives the gear wheel in response, at least in part, to an angular position of the gear wheel, and the gear wheel is rotatable in the housing prior to engagement with the output shaft.

5. The windscreen wiper drive mechanism of claim 4 wherein the gear wheel further comprises:

at least one projection extending parallel to the longitudinal axis of the gear wheel.

6. The windscreen wiper drive mechanism of claim 4 wherein the gear wheel further comprises:

at least one hub engageable with the housing.

7. The windscreen wiper drive mechanism of claim 4 characterized in that the gear wheel is provided with two hubs engageable with corresponding cylindrical recesses in the housing to support the gear wheel in an axial and a radial direction.

8. The windscreen wiper drive mechanism of claim 4 further comprising:

a crank lever is permanently connected to the output shaft.

9. The windscreen wiper drive mechanism of claim 8 wherein the lever is connected to the drive axis of the gear wheel as a one-piece part of the gear wheel.

10. The windscreen wiper drive mechanism of claim 4 characterized in that the output shaft is engaged with the gear wheel in a frictionally engaged manner.

11. The windscreen wiper drive mechanism of claim 4 characterized in that the output shaft is lockingly connected to the gear wheel.

12. A windscreen wiper drive mechanism, wherein the gear wheel is rotatably mounted in a housing, an electric motor drives a gear wheel in response, at least in part, to an angular position of the gear wheel, and the gear wheel is rotatable in the housing prior to engagement with the output shaft.

13. The windscreen wiper drive mechanism of claim 12 wherein the gear wheel supports itself in the radial direction on at least one projection that extends parallel to the longitudinal axis of the gear wheel.

14. The windscreen wiper drive mechanism of claim 13, characterized in that the gear wheel is provided with at least one hub which supports itself with its cover surface on assigned projections in the housing in the radial direction.

15. The windscreen wiper drive mechanism of claim 12 characterized in that the gear wheel is provided with two hubs supported on floor surfaces and cover surfaces of two cylindrical recesses in the axial and the radial direction.

16. The windscreen wiper drive mechanism of claim 12, characterized in that the lever is permanently connected the drive axis of the gear wheel.

17. The windscreen wiper drive mechanism of claim 16 wherein the lever is connected to the drive axis of the gear wheel as a one-piece part of the gear wheel.

18. The windscreen wiper drive mechanism of claim 12 characterized in that the output axis is connected to the gear wheel in a frictionally engaged manner.

19. The windscreen wiper drive mechanism of claim 12 characterized in that the output axis is lockingly connected to the gear wheel.

\* \* \* \* \*